(12) United States Patent
Wu et al.

(10) Patent No.: US 8,118,580 B2
(45) Date of Patent: Feb. 21, 2012

(54) INJECTION MOLD

(75) Inventors: Xiaoping Wu, Taipei (TW); Xuxu Zhao, Taipei (TW); Shih-Hsiung Ho, Taipei (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 65 days.

(21) Appl. No.: 12/787,123

(22) Filed: May 25, 2010

(65) Prior Publication Data

US 2011/0293768 A1    Dec. 1, 2011

(51) Int. Cl.
*B29C 45/14*    (2006.01)

(52) U.S. Cl. ............ 425/127; 425/129.1; 425/190; 425/192 R

(58) Field of Classification Search ............. 425/182, 425/190, 192 R, 127, 129.1
See application file for complete search history.

(56) References Cited

U.S. PATENT DOCUMENTS

| | | | | |
|---|---|---|---|---|
| 5,451,156 A | * | 9/1995 | Roncelli et al. | 425/192 R |
| 5,562,935 A | * | 10/1996 | Martin | 425/552 |
| 7,766,639 B2 | * | 8/2010 | Tsai | 425/108 |
| 2008/0248151 A1 | * | 10/2008 | Chen et al. | 425/192 R |
| 2009/0324767 A1 | * | 12/2009 | Kloeppel et al. | 425/190 |

* cited by examiner

*Primary Examiner* — Timothy Heitbrink
(74) *Attorney, Agent, or Firm* — WPAT, P.C.; Anthony King

(57) ABSTRACT

An injection mold has a lower mold half having a chamber at a top thereof. A holding plate has a top within the chamber formed with a plurality of holding slots. The holding slots extend frontward and rearward. A positioning plate is attached to a front surface of the holding plate, an upper portion of which within the chamber has a plurality of positioning holes at a front surface thereof. A fixing plate disposed rearward of the holding plate has a plurality of through holes at a top thereof. A plurality of first positioning rods is mounted to the installing holes, each of which defines a free end extending beyond the top of the fixing plate. A free end of each of a plurality of second positioning rods is capable of inserting into the positioning hole. An upper mold half is engaged with the lower mold half.

7 Claims, 6 Drawing Sheets

US 8,118,580 B2

INJECTION MOLD

BACKGROUND OF THE INVENTION

1. Field of the Invention

The present invention relates to an injection mold, and particularly to an injection mold with an insert component.

2. The Related Art

Generally, a conventional process of an insert molding includes following steps. Firstly, an insert component is mounted in an injection mold. Secondly, the thermoplastic resin is injected into the injection mold. Thirdly, the thermoplastic resin and the insert component are integrally molded and cooled to form a plastic product. Herein, the location of the insert component in the injection mold is very important during the insert molding for preventing from non-conform products. However, as the electronic products develop towards the multifunction and miniaturization, the structure of the electronic products are getting more and more complicated. Accordingly, the volume of the insert component mounted to the injection mold for molding an insulating portion of the electronic product is decreased. As a result, it's difficult for people to locate the position of the insert component in the injection mold steadily for preventing from the movement and the deformation of the insert component in the molding process.

SUMMARY OF THE INVENTION

Accordingly, an object of the present invention is to provide an injection mold. The injection mold is adapted for positioning a terminal unit therein to carry out an insert molding. The terminal unit has a plurality of terminals of L shape, a first connecting strip and a second connecting strip. Each of the terminals has two free ends connected to a side edge of the first connecting strip and a side edge of the second connecting strip, respectively, for making the terminals be settled side by side. The first connecting strip and the second connecting strip are respectively formed with a plurality of abreast installing holes and fixing holes. The injection mold has a lower mold half having a chamber at a top thereof. A holding plate has a top within the chamber formed with a plurality of holding slots. The holding slots extend frontward and rearward, and arranged side by side for fixing the terminals. A positioning plate is attached to a front surface of the holding plate. An upper portion of the positioning plate within the chamber has a plurality of positioning holes at a front surface thereof, corresponding to the fixing holes. A fixing plate is disposed rearward of the holding plate. The fixing plate has a plurality of through holes at a top thereof, corresponding to the installing holes. A plurality of first positioning rods is mounted to the installing holes. Each of the first positioning rods defines a free end extending beyond the top of the fixing plate for engaging with the corresponding installing hole of the first connecting strip when the first connecting strip is attached to the top of the fixing plate. A free end of each of a plurality of second positioning rods passes through the corresponding fixing hole of the second connecting strip and is inserted into the positioning hole when the second connecting strip is attached to the front surface of the positioning plate. An upper mold half is engaged with the lower mold half.

As described above, the injection mold are provided with the first positioning rods and the second positioning rods. The plural terminals are arranged side by side and positioned by the first connecting strip and the second connecting strip. The free ends of the first positioning rods pass through the installing holes of the first connecting strip. The free ends of the second positioning rods pass through the fixing holes of the second connecting strip. The holding slots respectively restrain the terminals. Thus the terminal unit is fixed in the injection mold firmly, which is effective to prevent the terminals from moving and deforming in the molding process.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
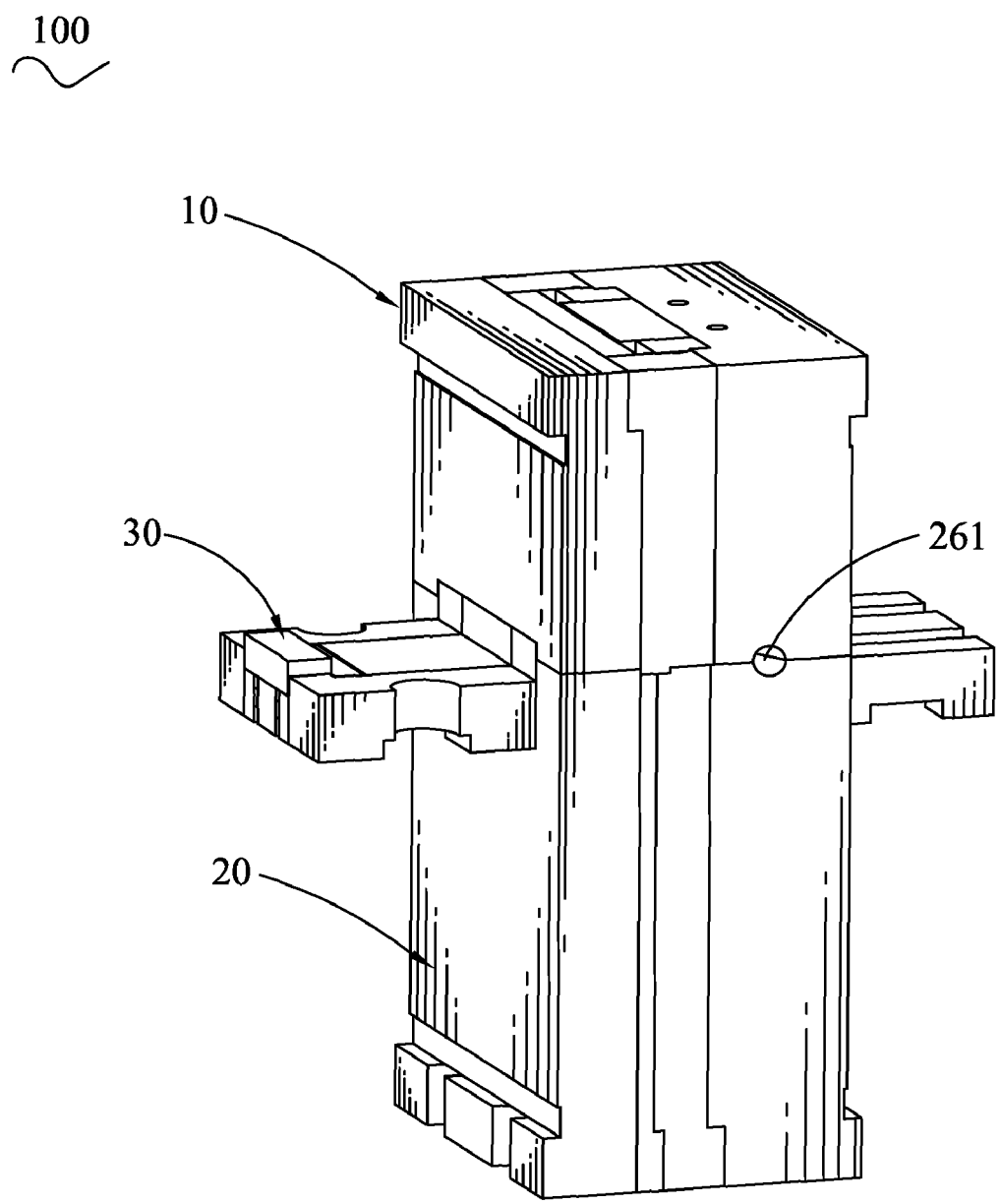
FIG. 1 is an assembled, perspective view of an injection mold of an embodiment in accordance with the present invention.
Figure 2:
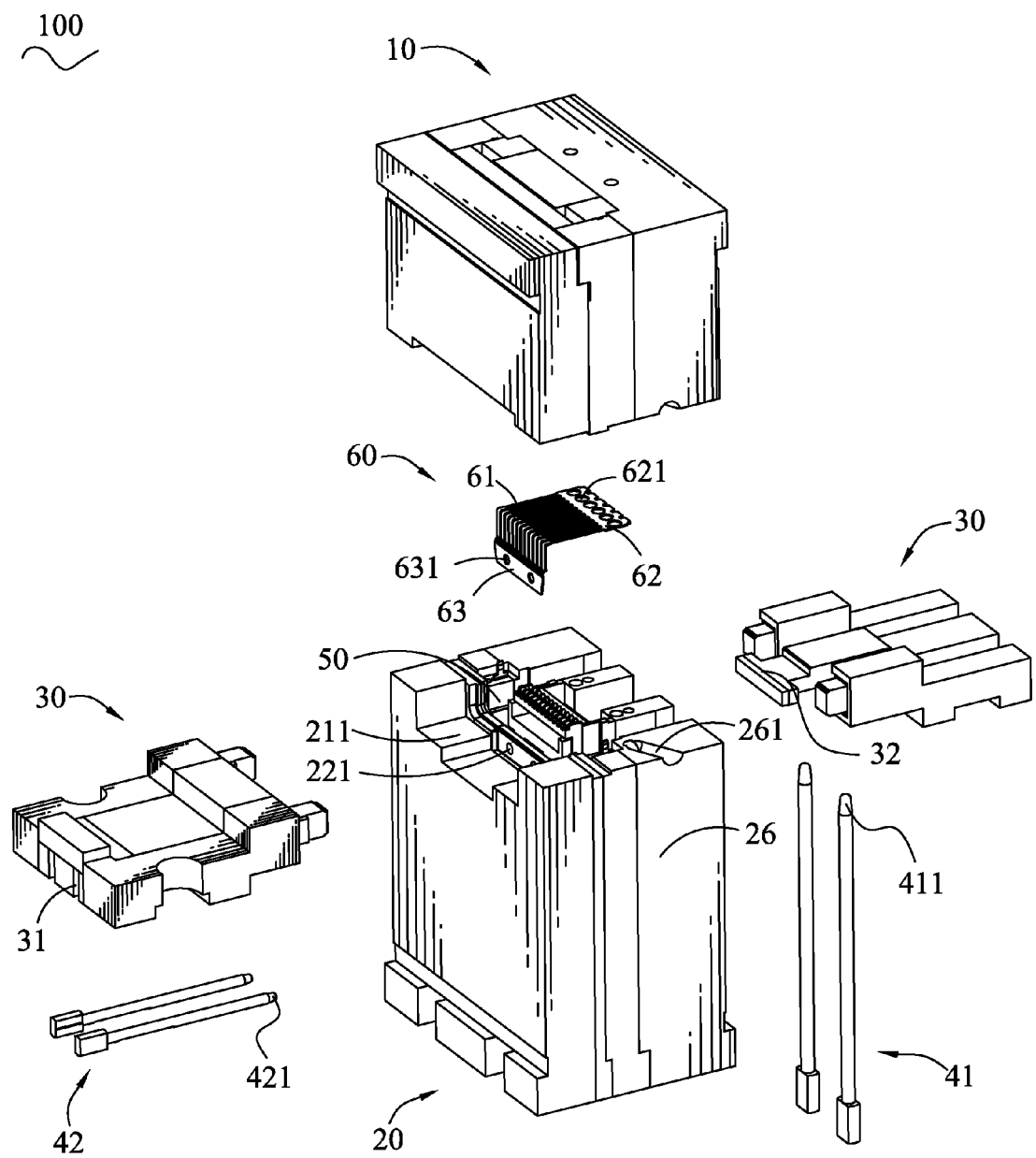
FIG. 2 is an exploded, perspective view of the injection mold shown in FIG. 1.

Referring to the drawings in greater detail, and refer to FIGS. 1-2, the embodiment of the invention is shown in an injection mold 100. The injection mold 100 includes an upper mold half 10, a lower mold half 20 coupled with the upper mold half 10, a plurality of sliding elements 30 mounted to the lower mold half 20, and a pair of first and second positioning rods 41, 42 mounted to the lower mold half 20. The upper mold half 10, the lower mold half 20 and the sliding elements 30 cooperatively surround a molding chamber (not shown).

Figure 3:
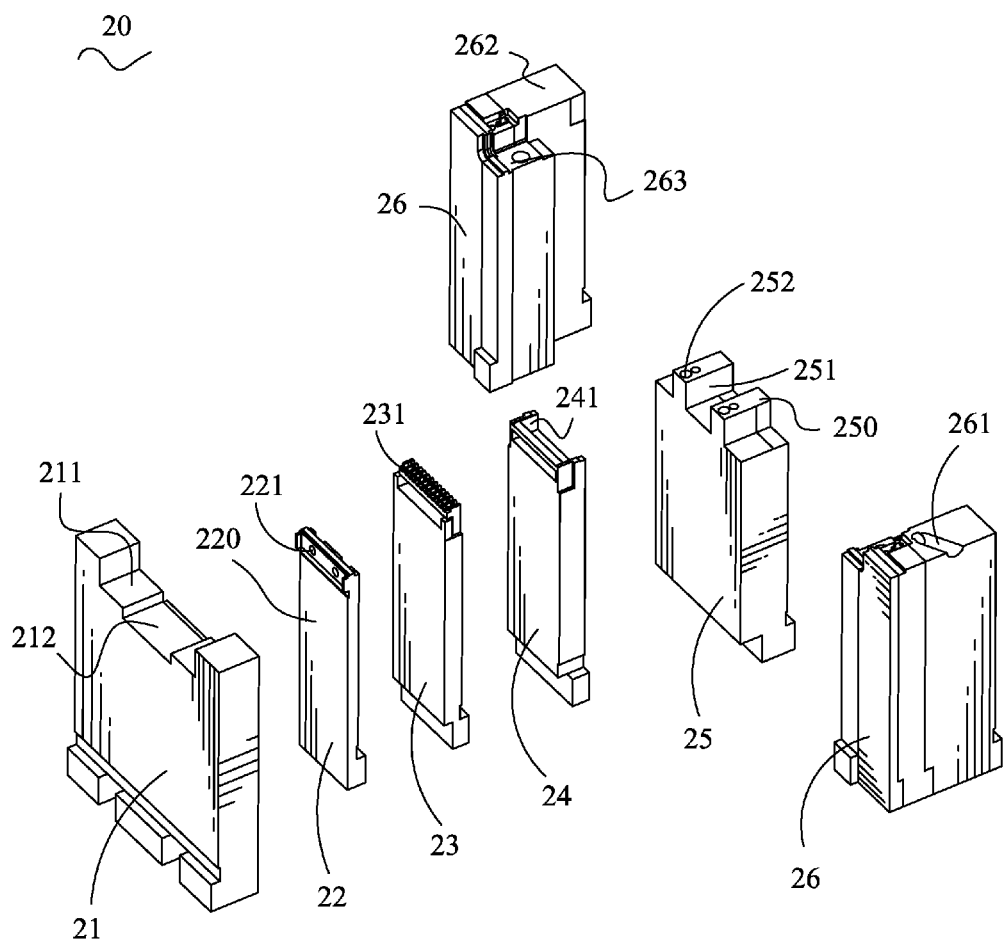
FIG. 3 is an exploded, perspective view of a lower mold half of the injection mold shown in FIG. 2.

With reference to FIGS. 2-3, the lower mold half 20 comprises a base plate 21, a positioning plate 22, a holding plate 23, a partition 24, a fixing plate 25 and two lateral plates 26. The base plate 21 is substantially square shape. A top of the base plate 21 has an opening 211 at a middle portion thereof. The opening 211 has a bottom formed with a notch 212 at a middle portion thereof. The rectangular positioning plate 22 is attached to a rear surface of the base plate 21, with a width thereof perpendicular to an up-and-down direction less than that of the base plate 21. The positioning plate 22 defines a front surface 220. The front surface 220 has an upper portion which is exposed by the notch 212, is formed with two positioning holes 221. The positioning holes 221 pass through the positioning plate 22 and are spaced from each other with a predetermined distance. The holding plate 23, attached to a rear surface of the positioning plate 22, is rectangular and has a width substantially same as that of the positioning plate 22. A top of the holding plate 23 is formed with a plurality of holding slots 231, extending frontward and rearward. The holding slots 231 are arranged side by side and spaced from one another at certain intervals. The partition 24, which is disposed between the holding plate 23 and the fixing plate 25, is rectangular and has a width substantially same as that of the holding plate 23. A rear of a top of the partition 24 is formed with a buckling notch 241. The fixing plate 25 is substantially rectangular and has a width larger than that of the partition 24 and less than that of the base plate 21. A top 250 of the fixing plate 25 is formed with two blocks 251. The blocks 251 are substantially bar-shaped and extend frontward and rearward. A width between the abreast blocks 251 is smaller than that of the buckling notch 241. Each of the blocks 251 has a through hole 252 at a front end of the top 250 thereof. The through hole 252 extend upward and downward and pass through the whole fixing plate 25. The first positioning rods 41 are respectively inserted into the through holes 252, with tapered free ends 411 extending beyond the top 250 of the blocks 251. Each of the lateral plates 26 has cross-section of substantially L shape and defines a first leg 262 and a second leg 263 located at a front end of a side of the first leg 262. The second leg 263 has a top surface lower than that of the first leg 262 with a predetermined distance. The lateral plates 26 are secured to and surround two sides of a combination which is made up of the positioning plate 22, the holding plate 23, the partition 24, and the fixing plate 25, with a chamber 50 formed thereamong. One of the lateral plates 26 has a sprue channel 261 at the top surface of the first leg 262, for communicating with the chamber 50.

Please refer to FIG. 2, the two sliding elements 30, with shapes thereof depending on that of the chamber 50, are inserted into the chamber 50 in a front direction and a rear direction, respectively. The front sliding element 30 further has two sliding grooves 31. The sliding grooves 31 extend frontward and rearwards. The second positioning rods 42 are restrained in the sliding grooves 31, with tapered free ends 421 exposing out of a rear surface of the front sliding element 30. The rear sliding element 30 has a protrusion 32 of substantially T shape at a front end thereof, for buckling with the buckling notch 241.

Figure 4:
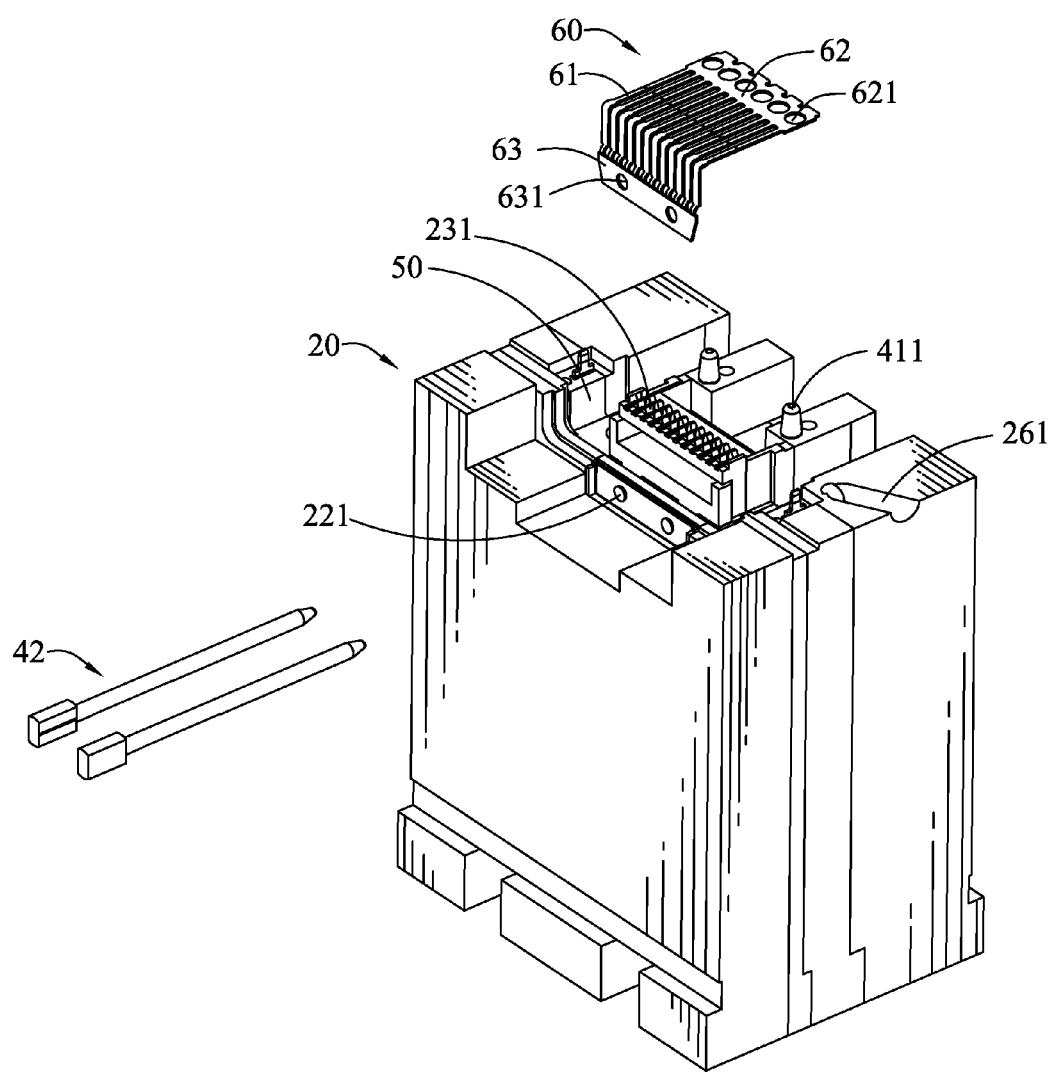
FIG. 4 is an exploded, perspective view of the injection mold shown in FIG. 2, wherein an upper mold half, a plurality of sliding elements and a pair of first positioning rods are removed.
Figure 5:
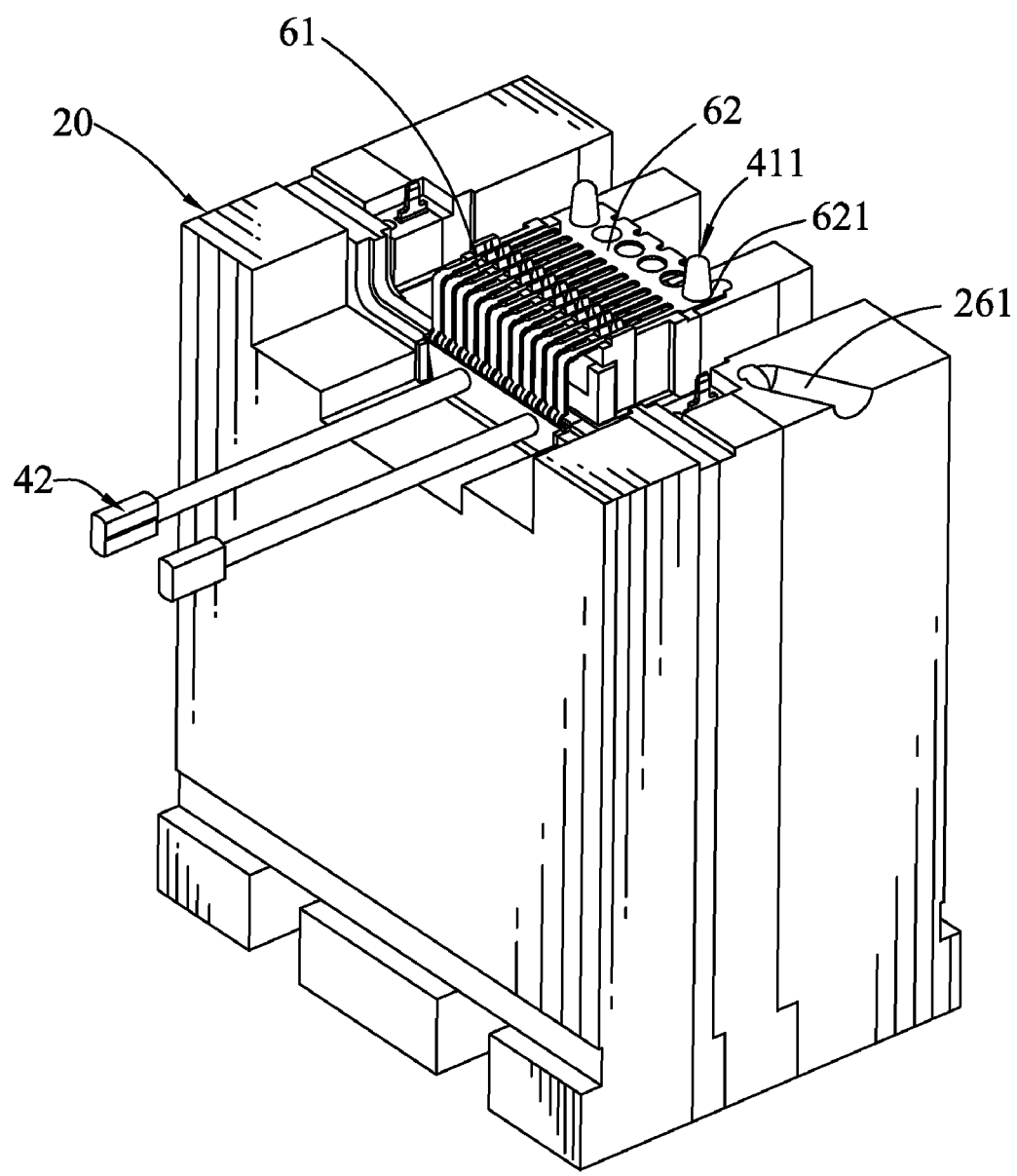
FIG. 5 is an assembled, perspective view of the injection mold shown in FIG. 1, wherein the upper mold half, the sliding elements and the first positioning rods are removed.
Figure 6:
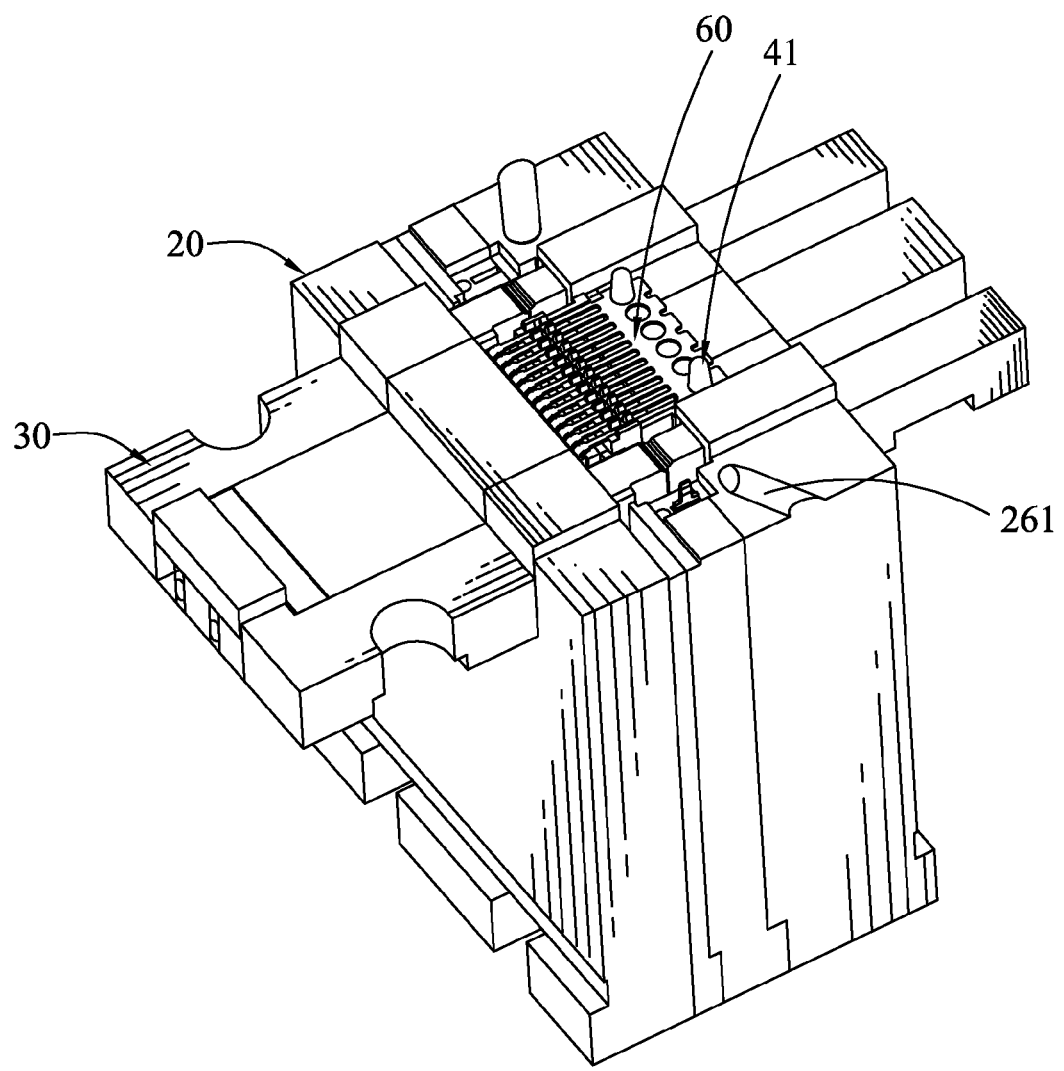
FIG. 6 is an assembled, perspective view of the injection mold shown in FIG. 1, wherein the upper mold half is removed.

Please refer to FIGS. 4-6, the injection mold 100 is adapted for molding an insulating housing of a connector (not shown). A terminal unit 60 served as an insert component, is integrally molded with the insulating housing. The terminal unit 60 has a plurality of terminals 61, a first connecting strip 62 and a second connecting strip 63. The terminals 61 are L-shaped and arranged side by side. Each of the terminals 61 has two opposite ends connected to a side edge of the first connecting strip 62 and a side edge of the second connecting strip 63, respectively. The first connecting strip 62 has a plurality of installing holes 621 arranged to form a row perpendicular to an extending direction of the terminals 61. The second connecting strip 63 is formed with two fixing holes 631, corresponding to the positioning holes 221.

Referring to FIG. 1 and FIGS. 4-6, in the molding process, the terminal unit 60 is mounted to the lower mold half 20. The first connecting strip 62 is attached to the top 250 of the blocks 251. The tapered free ends 411 pass through the corresponding installing holes 621, and the terminals 61 are respectively restrained the holding slots 231, for preventing the terminal unit 60 from moving levelly. The second connecting strip 63 is adhered to the front surface 220 of the positioning plate 22. The tapered free ends 421 of the second positioning rods 42 pass through the fixing holes 631 and insert into the positioning holes 221 for preventing the terminal unit 60 from moving upwards and downwards. The front sliding element 30 is moved rearwards to rest against the second connecting strip 63, with the second positioning rods 42 received in the sliding grooves 31. The upper mold half 10 is engaged with the lower mold half 20. The thermoplastic resin is injected into the molding chamber by the sprue channel 261 to mold the insulating housing with the terminals 61. The first and second connecting strips 62, 63 can be removed by means of the fixture when the insulating housing is taken out from the injection mold 100.

As described above, the injection mold 100 are provided with the first positioning rods 41 and the second positioning rods 42. The plural terminals 61 are arranged side by side and positioned by the first connecting strip 62 and the second connecting strip 63. The tapered free ends 411 of the first positioning rods 41 pass through the installing holes 621 of the first connecting strip 62. The tapered free ends 421 of the second positioning rods 42 pass through the fixing holes 631 of the second connecting strip 63. The holding slots 231 respectively restrain the terminals 61. Thus the terminal unit 60 is fixed in the injection mold 100 firmly, which is effective to prevent the terminals 61 from moving and deforming in the molding process.

What is claimed is:

1. An injection mold for positioning a terminal unit therein to carry out an insert molding, the terminal unit having a plurality of terminals of L shape, a first connecting strip, and a second connecting strip, each of the terminals having two free ends connected to a side edge of the first connecting strip and a side edge of the second connecting strip, respectively, for making the terminals be settled side by side, the first connecting strip and the second connecting strip respectively formed with a plurality of abreast installing holes and fixing holes, the injection mold comprising:
   a lower mold half having a chamber at a top thereof, a holding plate having a top within the chamber formed with a plurality of holding slots, the holding slots extending frontward and rearward, and arranged side by side for fixing the terminals, a positioning plate attached to a front surface of the holding plate, an upper portion of the positioning plate within the chamber having a plurality of positioning holes at a front surface thereof, corresponding to the fixing holes, a fixing plate disposed rearward of the holding plate, the fixing plate having a plurality of through holes at a top thereof, corresponding to the installing holes;
   a plurality of first positioning rods, each of the first positioning rods defining a free end extending beyond the top of the fixing plate for engaging with the corresponding installing hole of the first connecting strip when the first connecting strip is attached to the top of the fixing plate;
   a plurality of second positioning rods, a free end of the second positioning rod passing through the corresponding fixing hole of the second connecting strip and inserted into the positioning hole when the second connecting strip is attached to the front surface of the positioning plate; and
   an upper mold half engaged with the lower mold half.

2. The injection mold as claimed in claim 1, wherein the lower mold half further has a base plate attached to the front surface of the positioning plate, and a pair of lateral plates surrounding two sides of a combination of the positioning plate, the holding plate and the fixing plate, to form the chamber.

3. The injection mold as claimed in claim 2, wherein the base plate has an opening at a top thereof and a sliding element is slid into the chamber through the opening.

4. The injection mold as claimed in claim 3, wherein the opening has a notch at a bottom thereof, a bottom of the notch is lower than the positioning holes, the sliding element has a plurality of sliding grooves extending frontward and downwards, the second positioning rods being fixed in the sliding grooves.

5. The injection mold as claimed in claim 2, wherein one of the lateral plates has a sprue channel at a top thereof and communicating with the chamber.

6. The injection mold as claimed in claim 1, wherein the top of the fixing plate is formed with two breast blocks of substantially bar shape, the through hole is formed at a top of the block.

7. The injection mold as claimed in claim 1, wherein the free end of the first positioning rod or the second positioning rod is formed with a tapered shape.

\* \* \* \* \*